UNITED STATES PATENT OFFICE.

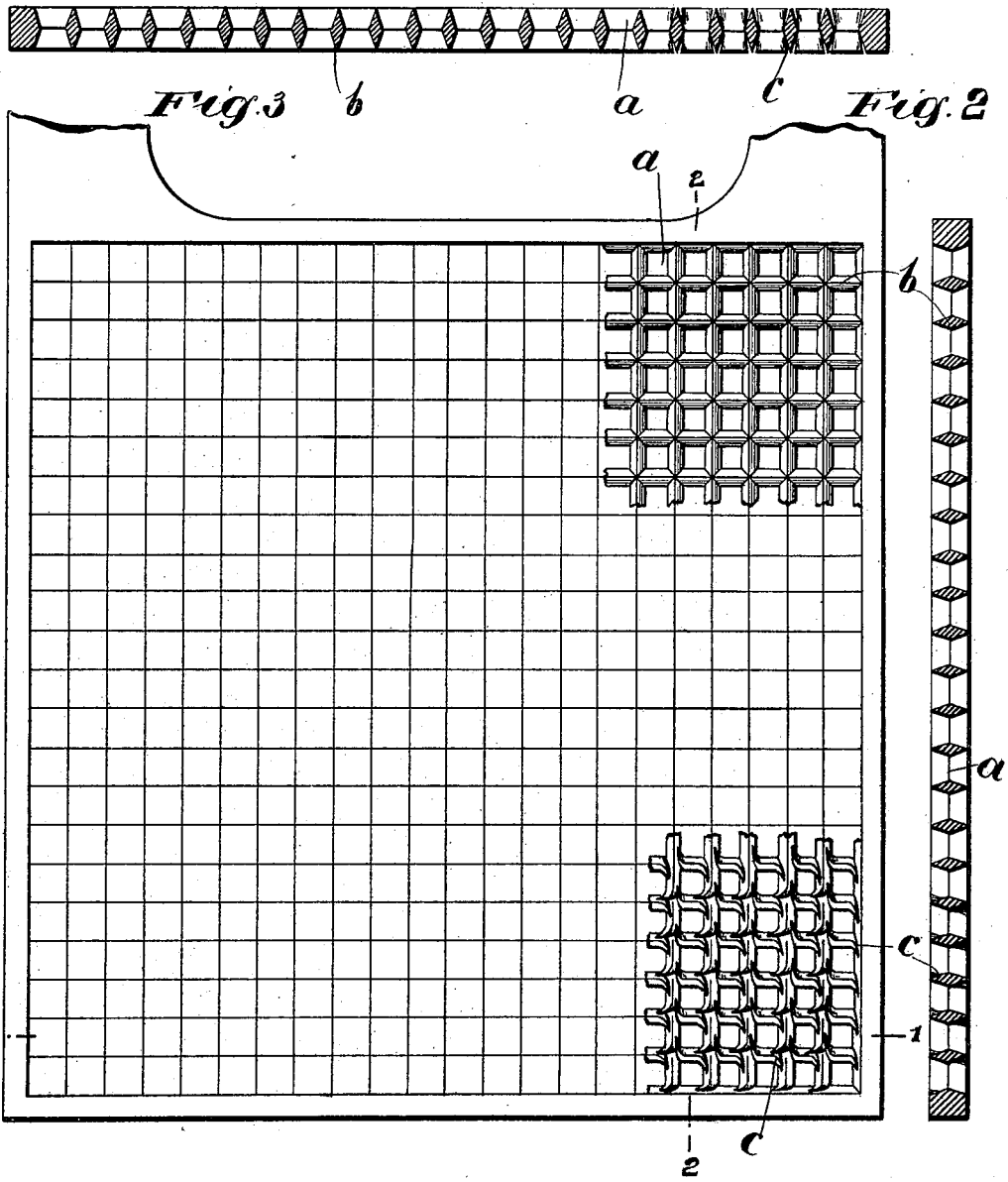

FEDERICO PESCETTO, OF TURIN, ITALY.

ELECTRIC ACCUMULATOR.

SPECIFICATION forming part of Letters Patent No. 614,339, dated November 15, 1898.

Application filed December 24, 1897. Serial No. 663,362. (No model.)

*To all whom it may concern:*

Be it known that I, FEDERICO PESCETTO, a subject of the King of Italy, and a resident of Turin, Italy, have invented certain new and useful Improvements in Electric Accumulators, (which have been patented in Great Britain, No. 18,430, dated August 7, 1897; in Italy, No. 41,638, dated June 1, 1896; in Belgium, No. 126,336, dated February 27, 1897, and in France, No. 263,958, dated May 18, 1897,) of which the following is a full, clear, and exact description.

The present invention relates to improvements in the manufacture of electric accumulators, and has specially as its object improvements in the preparation of the plates before putting the paste upon them and in the preparation of the active material. The first improvement has for its scope the retention of the active material and to assure the contact with the plates. The second has for its scope the augmentation of the reacting surface of the electrodes, with the consequent advantages of a notable augmentation in the capacity of the element and of the possibility of subjecting it to considerable range of charge and discharge. Finally, both improvements have as the object the reduction (in the same conditions of capacity and range) of the weight of the batteries in comparison with those of other systems, rendering them in this manner specially apt for traction service.

Figures 1 and 2 of the annexed drawings represent a transverse and a longitudinal section of a plate obtained by casting in the usual manner and in part fashioned as hereinafter described. Fig. 3 is a plan of the same.

The electrode-plates are cast substantially the usual shape—that is, they have a series of holes $a$ separated by two sets of parallel ridges $b$, whose surfaces are slanting, as shown in the sectional views. The upper right-hand corner of Fig. 3 shows this usual arrangement. It will of course be understood that the whole plate is so constructed. The plates so obtained by casting are fashioned by hand with a tool or knife held obliquely on the border of the holes and in such a manner that the blade leans over the sides of each hole, which is to the right of the operator. The operation is made thrice and turning the plate each time ninety degrees, and the same operation is repeated on the opposite face of the plate. By this operation the ridges separating the holes will be thrown up at each point of intersection of two ridges, as shown at the lower right-hand corner of Fig. 3. Projecting teeth or burs $c$ will thus be formed, roughening the surface of the electrode-frame and forming an efficient means of holding the active mass in position.

It is evident that by modifying the plate by the above-mentioned fashioning the object is attained of retaining the active material without preventing the perfect formation of the active mass. In the minium and in the litharge which serve to form the active mass of active material of the plates is mixed a special substance in the proportion of five per cent. to ten per cent. of the respective weight of the above said oxids. This substance is ulmate of ulmin, (a well-defined chemical substance,) and it is obtained with the known chemical means. It must, however, be reduced to only 1.5 degrees of acidity at the maximum and must be used at the consistency of putty. To this state it must if dry be reduced by mixing it with distilled water.

According to the well-known chemist Mulder, ulmate of ulmin is prepared as follows: Twenty-two parts of sugar are dissolved in forty parts of water. Then one part of sulfuric acid of .66° is poured in, during which operation the temperature of the solution should not be allowed to rise above 45° centigrade. (A water-bath may be employed for cooling purposes.) Then, after settling, a certain quantity of water should be added and the solution heated to 80° centigrade. Finally the paste thus obtained should be neutralized to about 1.5° Baumé.

The mixture of the oxids of lead with the ulmate of ulmin must be as intimate as possible, and in order to facilitate this the same acidulated water can be employed which is commonly used for reducing the active material to a paste.

The ulmate of ulmin which deposits itself in very small grains lends itself admirably to render the active material of the plates porous, augmenting at the same time the active surface. Besides this it (being sufficiently conductive) improves to a great degree the continuity of the electric contacts, thus permitting the maximum of charge and discharge, such as no other element will permit.

The crumbling action, which with other plates manifests itself in unpleasant manner, is in the case of the present invention totally eliminated if only one succeeds in obtaining the ulmate as a compact paste of microscopic grains, which serve to cement the active material in a satisfactory manner in the holes of the plates.

Having now particularly described and ascertained the nature of my said invention and in what manner the same is to be performed, I declare that what I claim is—

An electrode for secondary batteries having an active mass containing ulmate of ulmin.

In witness whereof I have hereunto signed my name in the presence of two subscribing witnesses.

FEDERICO PESCETTO.

Witnesses:
  CESARE URTIS,
  HUGO FIZZOLU.